March 31, 1936.  H. R. RICARDO  2,035,569
CONTROL OF THE SUPPLY OF LIQUID FUEL TO THE AIR
CHARGE OF INTERNAL COMBUSTION ENGINES
Filed Nov. 22, 1933
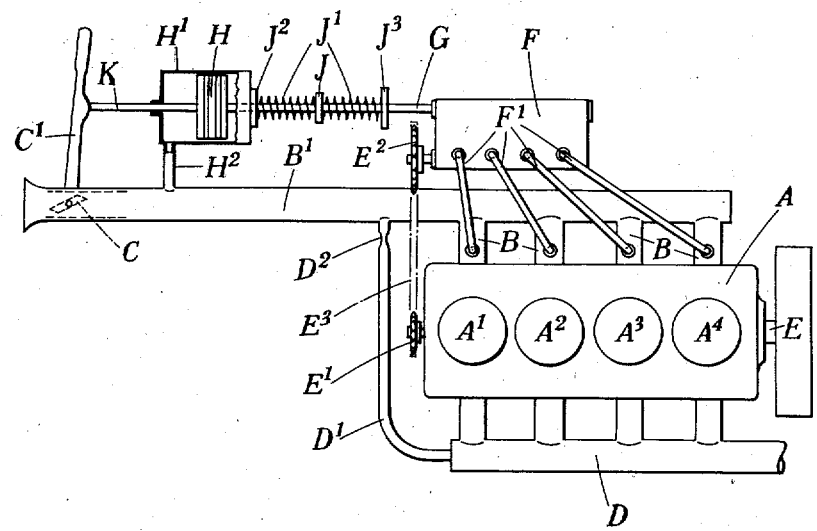
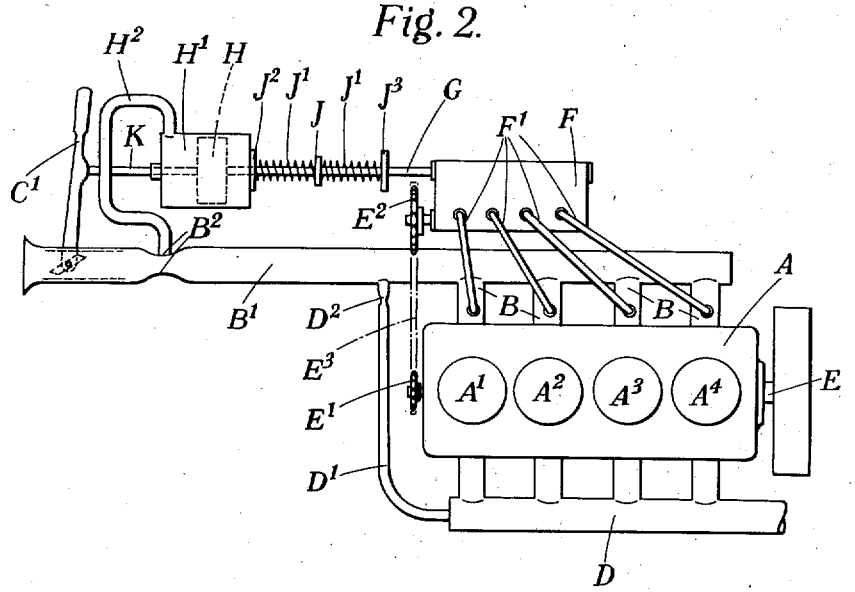
INVENTOR
Harry Ralph Ricardo,
BY
Watson, Coit, Morse & Grindle
ATTORNEY Patented Mar. 31, 1936

2,035,569

UNITED STATES PATENT OFFICE 2,035,569

CONTROL OF THE SUPPLY OF LIQUID FUEL TO THE AIR CHARGE OF INTERNAL COMBUSTION ENGINES

Harry Ralph Ricardo, London, England

Application November 22, 1933, Serial No. 699,280
In Great Britain November 30, 1932

10 Claims. (Cl. 123—139)

This invention relates to multi-cylinder internal combustion engines of the kind in which a combustible charge constituted by a volatile liquid fuel in the form of vapour or finely divided liquid particles and air is ignited by a spark and wherein the fuel is introduced into the air charge at every cycle of the engine by a metering pump, and has for its object to improve the control of the metering pump or pumps so as to tend to maintain the required ratio of fuel to air during all running conditions of the engine.

In engines of the kind referred to the fuel is admitted to the air charge in such a manner that the fuel is mixed intimately with the air before ignition, the fuel preferably being supplied by a separate metering pump which measures out and delivers the required quantity of fuel. The advantages of employing metering pumps in the above manner over the use of a carburettor are that approximately the whole of the latent heat of the vapourized fuel is available for lowering the temperature of the mixture within the cylinder so that a greater weight of charge is present in the cylinder at the end of the suction stroke, the compression temperature is reduced thus reducing the tendency for detonation to take place so that a somewhat higher compression ratio may be used, and more uniform distribution can be maintained as between the several cylinders of a multi-cylinder engine than is the case where a single carburettor feeds a number of cylinders. Further, the absence of combustible mixture within the induction manifold allows of a weaker mixture being used without risk of fire if backfiring occurs, eliminates considerable wastage due to deposition of the liquid on the walls of the induction passage which tends to take place when a carburettor is used in engines which operate under rapidly varying loads, reduces the tendency for dilution of the lubricating oil with liquid fuel, tends to enable the engine to develop substantial power immediately after starting up from cold, and eliminates difficulties due to the fact that with a carburettor the induction passage walls under certain running conditions are wet and under other conditions become dry so that on changing from one condition to the other either surplus fuel enters the air due to the drying off of the induction passage or fuel is taken from the vapourized charge by reason of the wetting of the induction passage walls. Moreover, losses in the charge density and the tendency to detonate resulting from preheating of the mixture are reduced or eliminated.

When employing the metering pump system for providing the combustible charge in engines of the kind in question having a substantially fixed ratio of torque to speed, for example to marine or aircraft engines, a satisfactory ratio between the quantity of fuel and air can usually be obtained by the provision of a mechanical linkage interconnecting the metering member controlling the quantity of fuel delivered by the metering pump or pumps and the throttle in the induction pipe, but when employing this system in engines such as those used on road vehicles in which there is no definite ratio between torque and speed, there is difficulty in maintaining the correct proportion of fuel to air under the varying conditions, which render a simple mechanical linkage impracticable, and the object of the present invention is to overcome these difficulties.

To this end according to the present invention not only is fuel delivered separately to the air charge for each cylinder but means are provided whereby the quantity of fuel delivered by the metering pump or pumps is controlled in accordance with the pressure in the induction passage, and since at all speeds under normal conditions of positive load it has been found that, assuming constant atmospheric pressure, the absolute pressure in the induction passage is approximately proportional to the weight of air entering each cylinder per cycle, it will be seen that with such a control a substantially constant ratio of fuel to air can be maintained.

Although, as stated, the absolute pressure in the induction passage is approximately proportional to the weight of air entering each cylinder per cycle under normal conditions of positive load, yet when over-running occurs, that is to say when, in the case of a motor vehicle, the vehicle is driving the engine as when decelerating or going downhill, it is desirable that the fuel supply should be completely cut off since the depression in the induction pipe when over-running is little greater than when idling at a slow speed, this depression when idling being nearly at a minimum and only a slightly increased depression being obtained if the vehicle over-runs the engine. Thus unless some special means are provided, with apparatus controlled according to this invention by the depression in the induction pipe, the quantity of fuel delivered per cycle when over-running occurs would be substantially the same as when idling, although the weight of air drawn in to each cylinder per cycle would be inversely proportional to the engine speed. From this it follows that when over-running at high speed, whereas the weight of air taken in by the engine would be virtually constant for any given time interval, the fuel delivered for the same time interval would be proportional to the speed with the result that each cylinder would receive an excessively over-rich mixture under conditions when so little air charge is drawn in on each induction stroke that the mixture might not ignite, thus causing wastage of fuel and dilution of the oil in the cylinders with the fuel.

The above difficulty could be overcome by employing a system of mechanical linkage so that the very small increase in depression in the induction pipe between the depression when idling and the depression when over-running would cause a comparatively large movement of the member controlling the quantity of fuel delivered by the metering pump or pumps whereby this small increase in depression would result in a complete cutting off of the fuel supply. Such an arrangement, however, would be very delicate and difficult to maintain as well as involving mechanical complication, the difficulty being increased by the fact that when idling a comparatively rich mixture is required as compared with when developing positive torque under normal running conditions.

Preferably, therefore, with a view to overcoming the above difficulty, according to a further feature of the present invention means are provided whereby inert gaseous products of combustion from the engine are permitted to enter the induction pipe when the pressure therein is low so as to raise the absolute pressure in the induction pipe when idling without increasing the quantity of air supplied to the engine. In this way, while the depression in the induction pipe can be reduced when idling to a considerable extent without increasing the quantity of air supplied, yet when over-running occurs, the depression will increase to nearly the value it would have if no exhaust gases were admitted, so that it differs very considerably from the depression when idling. It will thus be seen that by controlling the quantity of fuel delivered by the metering pump or pumps in accordance with the pressure in the induction passage and permitting exhaust gases to enter the induction passage when the pressure therein is low, it will be possible in a simple manner to cause this control to operate so that a sufficient quantity of fuel is delivered when the depression is that for idling whereas this fuel can be completely cut off when any considerable degree of over-running takes place.

Again, in engines of the kind to which the present invention relates, whereas during normal cruising conditions when maximum torque is not required it is desirable to employ a ratio of fuel to air which is economical under all conditions of speed and load, that is to say either a chemically correct ratio or a ratio having a slight excess of air over the chemically correct ratio, when the maximum torque is required, as when accelerating or hill climbing, a somewhat richer mixture having, say, 15% to 25% excess fuel over the chemically correct mixture is desirable.

To provide for this, according to a still further feature of the present invention, the arrangement may be such that whereas the quantity of fuel delivered by the metering pump or pumps is controlled in accordance with the absolute pressure in the induction passage so that under cruising conditions a mixture which is approximately chemically correct or has a slight excess of air over the chemically correct mixture is supplied, the final movement of the throttle into its fully open position effects an adjustment of the pump control mechanism so as to cause the pump or pumps to deliver a slightly larger proportion of fuel in relation to the air charge, for example such as to produce a mixture having between 15% and 25% excess fuel over the chemically correct mixture.

It will therefore be seen that by controlling the pump delivery in accordance with the absolute pressure in the induction pipe, providing means for admitting exhaust gases to the induction pipe when the pressure therein is low and means whereby the final opening movement of the throttle valve effects an adjustment to cause an increase in the quantity of fuel delivered by the pump or pumps, it is possible not only to provide for the delivery of an economic mixture for normal running conditions but to provide a slightly over-rich mixture when maximum torque is required and to ensure that when any considerable degree of over-running takes place the supply of fuel by the fuel pumps will be completely cut off. Further, when exhaust products are admitted as described above, the variation in induction passage pressure between that at idling and that when developing say 20% of the maximum positive torque, is reduced while a relatively large increase in the quantity of air admitted takes place when the throttle is moved from its idling to, say, its 20% torque position. Thus the slightly over-rich mixture usually desirable to provide steady running when idling can readily be obtained and yet the mixture is automatically weakened to provide an economical working mixture as soon as any appreciable positive torque is required.

The invention may be carried into practice in various ways but one construction according to this invention and a modification of this construction are illustrated diagrammatically by way of example in the accompanying drawing, in which Figure 1 is a plan of one construction, and
Figure 2 is a plan of the modified construction.

In the construction illustrated in Figure 1, the engine, A is provided with four inlet passages B communicating respectively with the inlet ports of the four cylinders $A^1$, $A^2$, $A^3$, $A^4$ and leading from an induction pipe $B^1$, the inlet of air to which is controlled by a throttle valve C adapted to be actuated by a lever $C^1$. The engine has an exhaust manifold D which communicates with the induction pipe $B^1$ through a passage $D^1$ having a metering orifice, indicated at $D^2$, arranged therein.

Driven from the crankshaft E of the engine, for example through chain wheels $E^1$, $E^2$ and a chain $E^3$, is a fuel delivery pump F having four cylinders connected by delivery pipes $F^1$ respectively to the four inlet passages B of the engine.

The fuel pump F is provided in known manner with a control member G whereby the quantity of fuel delivered on each plunger delivery stroke can be varied by moving this member longitudinally. The member G is connected to a piston H arranged in a cylinder $H^1$ one end of which communicates through a passage $H^2$ with the induction pipe $B^1$ while its other end communicates with the atmosphere. The control member G has rigidly secured to it a collar J on the opposite sides of which act the adjacent ends of two compression springs $J^1$ the opposite ends of which bear against fixed abutments $J^2$, $J^3$ so as to tend normally to maintain the piston in the position shown in Figure 1. The piston H is connected to a piston rod K passing through a gland at the end of the cylinder $H^1$ adjacent to the lever $C^1$, and the arrangement is such that towards the end of the movement of the lever $C^1$ to open the throttle valve C, this lever can act on the piston rod K so as to cause positive movement of the control member G of the fuel pump in a direction to increase the quantity of fuel delivered.

The timing of the fuel pump F is such in relation to that of the engine that fuel is delivered to the inlet pipe associated with each cylinder during each suction stroke of the piston in such cylinder, and the operation of the apparatus is as follows.

The right hand face of the piston H is subject to atmospheric pressure and during operation of the engine it will be seen that the left hand face of the piston H will be subject to the depression in the induction pipe, which in turn will be dependent partly upon the extent of opening of the throttle valve and partly upon the speed of the engine. The piston H will thus tend to occupy a position corresponding to the depression in the induction pipe. It will be appreciated that the lever $C^1$ does not normally act on the piston rod, since movement of the lever towards the piston rod opens the throttle and thus reduces the depression in the induction pipe, with the result that the piston and piston rod move to the right, and it is only when the throttle valve is practically fully open so that there is no substantial depression in the induction pipe, that the lever $C^1$ comes into contact with the piston rod K and can then act directly thereon to increase the quantity of fuel delivered and thus give a slightly over-rich mixture when absolutely full power is required. Thus while during normal operation when maximum power output is not required the control member G of the fuel pump is moved in accordance with the induction pipe pressure so that the fuel pump delivers at all times a quantity of fuel substantially proportial to the weight of air entering the cylinders, when maximum power output is desired the lever $C^1$ can over-ride the action of the depression in the induction pipe on the piston to enable the somewhat over-rich mixture required to be obtained.

Further, it will be seen that as the throttle C is closed and the depression in the induction pipe thus increases the quantity of inert exhaust gases which will be drawn into the induction pipe through the pipe $D^1$ increases, and the arrangement is such that although the quantity of air drawn in through the throttle valve C during idling is substantially that required for idling, the pressure in the induction pipe is still appreciably above normal idling pressure owing to the quantity of inert gases which are free to enter through the pipe $D^1$. When, however, with the throttle valve in its idling position the speed of the engine is above idling speed, e. g. when the engine is being driven by the vehicle as when decelerating or going downhill in a motor vehicle, the depression in the induction pipe falls to substantially idling depression and this moves the piston H so as completely to shut off the delivery of fuel by the fuel pump. Thus, while the correct quantity of fuel for idling is delivered when the engine is idling, the supply of fuel is completely cut off when, with the throttle valve in its idling position, the engine is rotating at any considerable speed in excess of normal idling speed.

In the modified construction shown in Figure 2, the arrangement is generally similar to that shown in Figure 1 except that the induction pipe $B^1$ has incorporated in it a venturi $B^2$ the throat of which has connected to it the pipe $H^2$. With this proposal the position of the piston H, and hence the quantity of fuel injected, is dependent to some extent not only on the actual depression in the induction pipe but also on the rate of flow of air through this pipe, so that when the engine is running at high speed with full throttle opening and the actual weight of air drawn into the cylinder per cycle may, due to the throttling effect of the inlet valves, be somewhat less than at full throttle opening at lower speed, the desired quantity of fuel in proportion to the air tends to be maintained.

In some cases as an alternative to providing the pipe $D^1$ between the exhaust manifold and the induction pipe, gaseous products of combustion may be admitted to the induction passage when the pressure therein is low, by operating the valves of the engine in such a manner that the inlet valve opens at a moment substantially before that at which the exhaust valve closes, so that when the pressure in the induction passage is low gaseous products of combustion will flow from each cylinder through the inlet port into the induction passage during the initial part of each opening period of the inlet valve.

Further, the manner in which adjustment of the fuel pump control mechanism is effected to cause the pump to deliver a somewhat greater quantity of fuel in relation to the induction passage pressure when the throttle valve is moved into its fully open position, may vary, and in one convenient alternative to that diagrammatically shown the control member of the pump may be operated through a lever having a movable fulcrum and the final movement of the throttle valve into its fully open position effects an adjustment of this fulcrum so that when the throttle valve is fully open a slightly greater quantity of fuel is delivered by the pump for any given induction pipe pressure.

Again, in some cases the fuel, instead of being delivered to the inlet pipe of each cylinder, may be delivered direct to the interior of the cylinder itself.

What I claim as my invention and desire to secure by Letters Patent is:—

1. A multi-cylinder internal combustion engine of the vapourized charge spark ignition type, including in combination an induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure in the induction passage, means whereby movement of the said member effects movement of the metering pump control member to reduce the quantity of fuel delivered when the induction passage pressure is reduced and to increase the quantity of fuel delivered when the induction passage pressure increases, and means for delivering gaseous products of combustion from the engine to the induction passage in substantial quantity when the pressure therein is low only, for the purpose set forth.

2. A multi-cylinder internal combustion engine of the vapourized charge spark ignition type, including in combination an induction passage, an exhaust passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure in the induction passage, means whereby movement of the said member effects movement of the metering pump control member to reduce the quantity of fuel delivered when the induction passage pressure is reduced and to increase the quantity of fuel delivered when the induction passage pressure increases, and a transfer passage constituting a communication between the induction passage and the exhaust passage of the engine so as to permit entry of gaseous products of combustion into the induction passage in substantial quantity when pressure therein is low only.

3. A multi-cylinder internal combustion engine of the vapourized charge spark ignition type, including in combination an induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure in the induction passage, means whereby movement of the said member effects movement of the metering pump control member to reduce the quantity of fuel delivered when the induction passage pressure is reduced and to increase the quantity of fuel delivered when the induction pressure increases, a throttle valve control member, and means whereby the final part only of the movement of this member in a direction to open the throttle valve applies a force to the metering pump control member to move it to increase the quantity of fuel delivered thereby above that which would be delivered if the metering pump control member were left under the sole control of the member which is movable in accordance with variations in the pressure in the induction passage.

4. A multi-cylinder internal combustion engine of the vapourized charge spark ignition type, including in combination an induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure in the induction passage, means whereby movement of the said member effects movement of the metering pump control member to reduce the quantity of fuel delivered when the induction passage pressure is reduced and to increase the quantity of fuel delivered when the induction passage pressure increases, means for delivering gaseous products of combustion from the engine to the induction passage in substantial quantity when the pressure therein is low only, a throttle valve control member, and means whereby the final part only of the movement of this member in a direction to open the throttle valve applies a force to the metering pump control member to move it to increase the quantity of fuel delivered thereby above that which would be delivered if the metering pump control member were left under the sole control of the member which is movable in accordance with variations in the pressure in the induction passage.

5. A multi-cylinder internal combustion engine of the vapourized charge spark ignition type, including in combination an induction passage, an exhaust passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure in the induction passage, means whereby movement of the said member effects movement of the metering pump control member to reduce the quantity of fuel delivered when the induction passage pressure is reduced and to increase the quantity of fuel delivered when the induction passage pressure increases, a transfer passage constituting a communication between the induction passage and the exhaust passage of the engine so as to permit entry of gaseous products of combustion into the induction passage in substantial quantity when pressure therein is low only, a throttle valve control member, and means whereby the final part only of the movement of this member in a direction to open the throttle valve applies a force to the metering pump control member to move it to increase the quantity of fuel delivered thereby above that which would be delivered if the metering pump control member were left under the sole control of the member which is movable in accordance with variations in the pressure in the induction passage.

6. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, and means whereby movement of the said member effects movement of the metering pump control member to reduce the quantity of fuel delivered when the pressure at the Venturi throat is reduced and to increase the quantity of fuel delivered when the pressure at the Venturi throat increases.

7. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, and means whereby gaseous products of combustion from the engine are permitted to enter the induction passage when the pressure therein is low, for the purpose set forth.

8. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, and a transfer passage constituting a communication between the induction passage and the exhaust passage of the engine so as to permit entry of gaseous products of combustion into the induction passage when pressure therein is low.

9. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, a throttle valve control member, and means whereby the final part of the movement of this member in a direction to open the throttle valve effects movement of the metering pump control member to increase the quantity of fuel delivered thereby above that which is delivered for corresponding induction passage pressures with smaller throttle openings.

10. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, means whereby gaseous products of combustion from the engine are permitted to enter the induction passage when the pressure therein is low, a throttle valve control member, and means whereby the final part of the movement of this member in a direction to open the throttle valve effects movement of the metering pump control member to increase the quantity of fuel delivered thereby above that which is delivered for corresponding induction passage pressures with smaller throttle openings.

HARRY RALPH RICARDO.

DISCLAIMER 2,035,569.—*Harry Ralph Ricardo*, London, England. CONTROL OF THE SUPPLY OF LIQUID FUEL TO THE AIR CHARGE OF INTERNAL COMBUSTION ENGINES. Patent dated March 31, 1936. Disclaimer filed May 18, 1937, by the patentee.
Hereby enters this disclaimer to claim 6.
[*Official Gazette June 15, 1937.*]

metering pump control member to reduce the quantity of fuel delivered when the pressure at the Venturi throat is reduced and to increase the quantity of fuel delivered when the pressure at the Venturi throat increases, and means whereby gaseous products of combustion from the engine are permitted to enter the induction passage when the pressure therein is low, for the purpose set forth.

8. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, and a transfer passage constituting a communication between the induction passage and the exhaust passage of the engine so as to permit entry of gaseous products of combustion into the induction passage when pressure therein is low.

9. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, a throttle valve control member, and means whereby the final part of the movement of this member in a direction to open the throttle valve effects movement of the metering pump control member to increase the quantity of fuel delivered thereby above that which is delivered for corresponding induction passage pressures with smaller throttle openings.

10. A multi-cylinder internal combustion engine of the vapourized charge spark ignition type, including in combination an induction passage, a venturi constituting part of the induction passage, a throttle valve controlling the air inlet of the induction passage, a metering pump driven by the engine for introducing liquid fuel separately into the air charge for each cylinder to form a combustible mixture, a control member for varying the quantity of fuel delivered by the metering pump, a member subject to and movable in accordance with variations in the pressure at the throat of the venturi, means whereby movement of the said member effects movement of the metering pump control member to reduce the quantity of fuel delivered when the pressure at the Venturi throat is reduced and to increase the quantity of fuel delivered when the pressure at the Venturi throat increases, means whereby gaseous products of combustion from the engine are permitted to enter the induction passage when the pressure therein is low, a throttle valve control member, and means whereby the final part of the movement of this member in a direction to open the throttle valve effects movement of the metering pump control member to increase the quantity of fuel delivered thereby above that which is delivered for corresponding induction passage pressures with smaller throttle openings.

HARRY RALPH RICARDO.

DISCLAIMER 2,035,569.—*Harry Ralph Ricardo*, London, England. CONTROL OF THE SUPPLY OF LIQUID FUEL TO THE AIR CHARGE OF INTERNAL COMBUSTION ENGINES. Patent dated March 31, 1936. Disclaimer filed May 18, 1937, by the patentee.
Hereby enters this disclaimer to claim 6.
[*Official Gazette June 15, 1937.*]

DISCLAIMER 2,035,569.—*Harry Ralph Ricardo*, London, England. CONTROL OF THE SUPPLY OF LIQUID FUEL TO THE AIR CHARGE OF INTERNAL COMBUSTION ENGINES. Patent dated March 31, 1936. Disclaimer filed May 18, 1937, by the patentee.

Hereby enters this disclaimer to claim 6.

[*Official Gazette June 15, 1937.*]